US012779633B2

(12) United States Patent
Yoshida et al.

(10) Patent No.: US 12,779,633 B2
(45) Date of Patent: Nov. 3, 2026

(54) ATTACHMENT

(71) Applicant: MAKITA CORPORATION, Anjo (JP)

(72) Inventors: Atsuya Yoshida, Anjo (JP); Yuya Inoue, Anjo (JP); Yukiya Matsuoka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 792 days.

(21) Appl. No.: 18/136,671

(22) Filed: Apr. 19, 2023

(65) Prior Publication Data

US 2023/0405774 A1 Dec. 21, 2023

(30) Foreign Application Priority Data

Jun. 17, 2022 (JP) ................................ 2022-098331

(51) Int. Cl.
*B25B 21/00* (2006.01)
*F16H 1/12* (2006.01)

(52) U.S. Cl.
CPC ............ *B25B 21/007* (2013.01); *F16H 1/12* (2013.01)

(58) Field of Classification Search
CPC ..... B25B 23/147; B25B 13/08; B25B 13/467; B25B 13/481; B25B 21/002; B25B 21/007; B25B 17/00; B25B 17/02
See application file for complete search history.

(56) References Cited

U.S. PATENT DOCUMENTS

| | | | | |
|---|---|---|---|---|
| 5,355,751 | A * | 10/1994 | Specht | B25B 23/147 81/57.3 |
| 5,522,285 | A * | 6/1996 | Wilson, Jr. | B25B 17/00 81/57.3 |
| 5,544,553 | A | 8/1996 | Galat | |
| 6,810,774 | B2 * | 11/2004 | Hsien | B25B 23/12 81/125 |
| 6,955,105 | B2 * | 10/2005 | Chen | B25B 13/12 81/125 |
| 7,311,025 | B1 * | 12/2007 | Wilson, Jr. | B25B 23/145 81/429 |

(Continued)

FOREIGN PATENT DOCUMENTS

| | | | |
|---|---|---|---|
| CN | 210616343 | U | 5/2020 |
| JP | 2887340 | B2 * | 4/1999 |

(Continued)

OTHER PUBLICATIONS

Abstract of CN210616343U.
Jan. 6, 2026 Office Action issued in Japanese Application No. 2022-098331.

*Primary Examiner* — David B. Thomas
(74) *Attorney, Agent, or Firm* — Oliff PLC

(57) ABSTRACT

To avoid prolonged operation time at construction sites, an attachment includes an input shaft rotatable about a first rotation axis to receive power input from a power tool, a tip socket including a recess having a socket opening, a housing having a housing opening to receive a workpiece and supporting the tip socket in a rotatable manner, a power transmission that transmits, to the tip socket, power input into the input shaft, and a front aligner that stops rotation of the tip socket with the socket opening being aligned with the housing opening.

20 Claims, 13 Drawing Sheets

(56) References Cited

U.S. PATENT DOCUMENTS

| | | | | | |
|---|---|---|---|---|---|
| 7,513,179 | B2 * | 4/2009 | Wilson, Jr. | B25B 21/002 81/429 |
| 7,942,084 | B2 * | 5/2011 | Wilson, Jr. | B25B 13/481 81/429 |
| 8,065,936 | B2 * | 11/2011 | Tutino | B25B 17/02 81/57 |
| 9,212,727 | B1 * | 12/2015 | Kesterson | B25G 1/063 |
| 9,381,625 | B2 * | 7/2016 | Chen | B25B 21/00 |
| 11,712,787 | B2 * | 8/2023 | Nick | B25B 21/004 81/57.11 |
| 2008/0134841 | A1 * | 6/2008 | Wilson | B25B 13/481 81/57.33 |
| 2011/0146462 | A1 * | 6/2011 | Watts, Sr. | B25B 13/08 81/125 |
| 2013/0118318 | A1 * | 5/2013 | Robertson | B25B 13/08 81/92 |
| 2016/0031067 | A1 * | 2/2016 | Batt | B25B 13/08 81/57.29 |
| 2017/0057057 | A1 * | 3/2017 | Wilson, Jr. | B25B 17/02 |
| 2021/0362304 | A1 * | 11/2021 | Carlsson | F16H 57/021 |
| 2024/0416489 | A1 * | 12/2024 | Lindström | B25B 23/147 |

FOREIGN PATENT DOCUMENTS

| | | | | |
|---|---|---|---|---|
| JP | H11138457 | A | * | 5/1999 |
| JP | 2011-206872 | A | | 10/2011 |
| JP | 2019-195870 | A | | 11/2019 |
| JP | 2021-091050 | A | | 6/2021 |
| JP | 2021-115663 | A | | 8/2021 |

* cited by examiner

ATTACHMENT

CROSS-REFERENCE TO RELATED APPLICATIONS

This application claims the benefit of priority to Japanese Patent Application No. 2022-098331, filed on Jun. 17, 2022, the entire contents of which are hereby incorporated by reference.

BACKGROUND

1. Technical Field

The present disclosure relates to an attachment.

2. Description of the Background

Fixtures such as floor posts or turnbuckles are used at construction sites. Japanese Unexamined Patent Application Publication No. 2021-115663 describes a tool for turnbuckles for adjusting the length of turnbuckles.

BRIEF SUMMARY

Floor posts support sleepers of buildings. The length of floor posts is adjusted at construction sites. A technique is awaited to avoid prolonged operation time at construction sites.

One or more aspects of the present disclosure are directed to a technique for avoiding prolonged operation time at construction sites.

A first aspect of the present disclosure provides an attachment, including:

- an input shaft rotatable about a first rotation axis, the input shaft being configured to receive power input from a power tool;
- a tip socket including a recess having a socket opening;
- a housing having a housing opening to receive a workpiece, the housing supporting the tip socket in a rotatable manner;
- a power transmission configured to transmit, to the tip socket, power input into the input shaft; and
- a front aligner configured to stop rotation of the tip socket with the socket opening being aligned with the housing opening.

The structure according to the above aspect of the present disclosure avoids prolonged operation time at construction sites.

DETAILED DESCRIPTION

One or more embodiments will now be described with reference to the drawings. The components in the embodiments described below may be combined as appropriate. One or more components may be eliminated.

In the embodiments, the positional relationships between the components will be described using the directional terms such as right and left (or lateral), front and rear (or frontward and rearward), and up and down (or vertical). The terms indicate relative positions or directions with respect to the center of an attachment.

Use of Attachment

Figure 1:
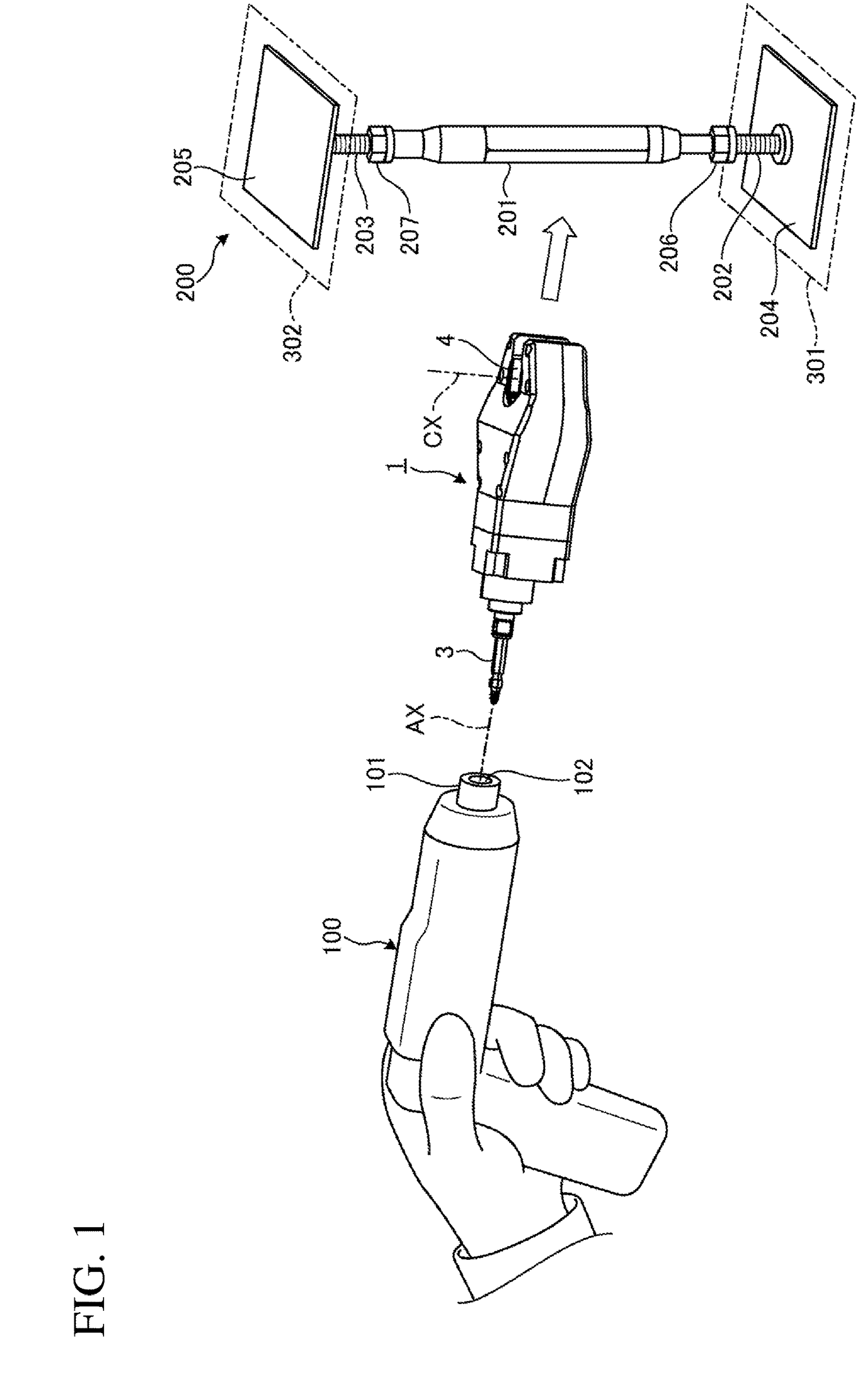
FIG. 1 is a schematic diagram of an attachment according to an embodiment showing its use.

FIG. 1 is a schematic diagram of an attachment 1 according to an embodiment showing its use. The attachment 1 is attachable to a power tool 100. In the example shown in FIG. 1, the power tool 100 is a pen-shaped driver drill. The power tool 100 may be any power rotary tool, such as an impact driver or a driver drill. The power tool 100 includes an output shaft 101 and a motor (not shown) to rotate the output shaft 101. The output shaft 101 has a tool hole 102 for receiving a screwdriver bit. The motor is driven to rotate the output shaft 101 when an operator operates a trigger switch in the power tool 100.

The attachment 1 is used for adjusting the length of a floor post 200. The floor post 200 is, for example, a resin post formed from a synthetic resin or a steel post formed from steel. The floor post 200 in the embodiment is a steel post. The floor post 200 is hereafter referred to as a steel post 200 as appropriate.

The steel post 200 is installed on a foundation 301 of a building. The steel post 200 supports a sleeper 302 of the building from below. The steel post 200 includes a post body 201, a lower stem screw 202, an upper stem screw 203, a base 204, and a support plate 205. The post body 201 extends vertically. The lower stem screw 202 is attachable to a lower end of the post body 201. The upper stem screw 203 is attachable to the upper end of the post body 201. The base 204 is fixed to the lower stem screw 202. The support plate 205 is fixed to the upper stem screw 203.

The post body 201 is a pipe. The post body 201 includes a vertically middle portion being a rectangular pipe. In other words, the post body 201 includes the vertically middle portion with a rectangular profile. The post body 201 has a lower threaded hole in its lower end, and an upper threaded hole in its upper end. The lower threaded hole and the upper threaded hole have opposite thread directions.

The lower stem screw 202 is placed into the lower threaded hole in the post body 201 from below the post body 201. The lower stem screw 202 is engaged with the lower threaded hole. The upper stem screw 203 is placed into the upper threaded hole in the post body 201 from above the post body 201. The upper stem screw 203 is engaged with the upper threaded hole.

The base 204 is fixed to the lower end of the lower stem screw 202. The base 204 is installed on the foundation 301. The support plate 205 is fixed to the upper end of the upper stem screw 203. The support plate 205 supports the sleeper 302.

The post body 201 rotates to change the degree by which the lower stem screw 202 is received in the lower threaded hole and the degree by which the upper stem screw 203 is received in the upper threaded hole. This then changes the distance between the base 204 and the support plate 205, and adjusts the length of the steel post 200 and the height of the support plate 205 from the base 204.

The lower stem screw 202 is surrounded by a lower locknut 206. The upper stem screw 203 is surrounded by an upper locknut 207. After the length of the steel post 200 is adjusted, the lower locknut 206 is rotated relative to the lower stem screw 202 to come in contact with the post body 201. The upper locknut 207 is rotated relative to the upper stem screw 203 to come in contact with the post body 201. This restricts relative rotation between the post body 201 and the lower stem screw 202 and between the post body 201 and the upper stem screw 203.

The attachment 1 includes an input shaft 3 and a tip socket 4. The input shaft 3 is received in the tool hole 102 in the power tool 100. The tip socket 4 surrounds the post body 201. The input shaft 3 rotates about a rotation axis AX (first rotation axis). The tip socket 4 rotates about a rotation axis CX (second rotation axis). An axis parallel to the rotation axis AX is perpendicular to the rotation axis CX. With the input shaft 3 received in the tool hole 102 and the tip socket 4 surrounding the post body 201, the trigger switch in the power tool 100 is operated to drive the motor and rotate the output shaft 101. The input shaft 3 receives power from the power tool 100 to rotate about the rotation axis AX. This rotates the tip socket 4 about the rotation axis CX. The post body 201 then rotates. This adjusts the length of the steel post 200.

Attachment

Figure 2:
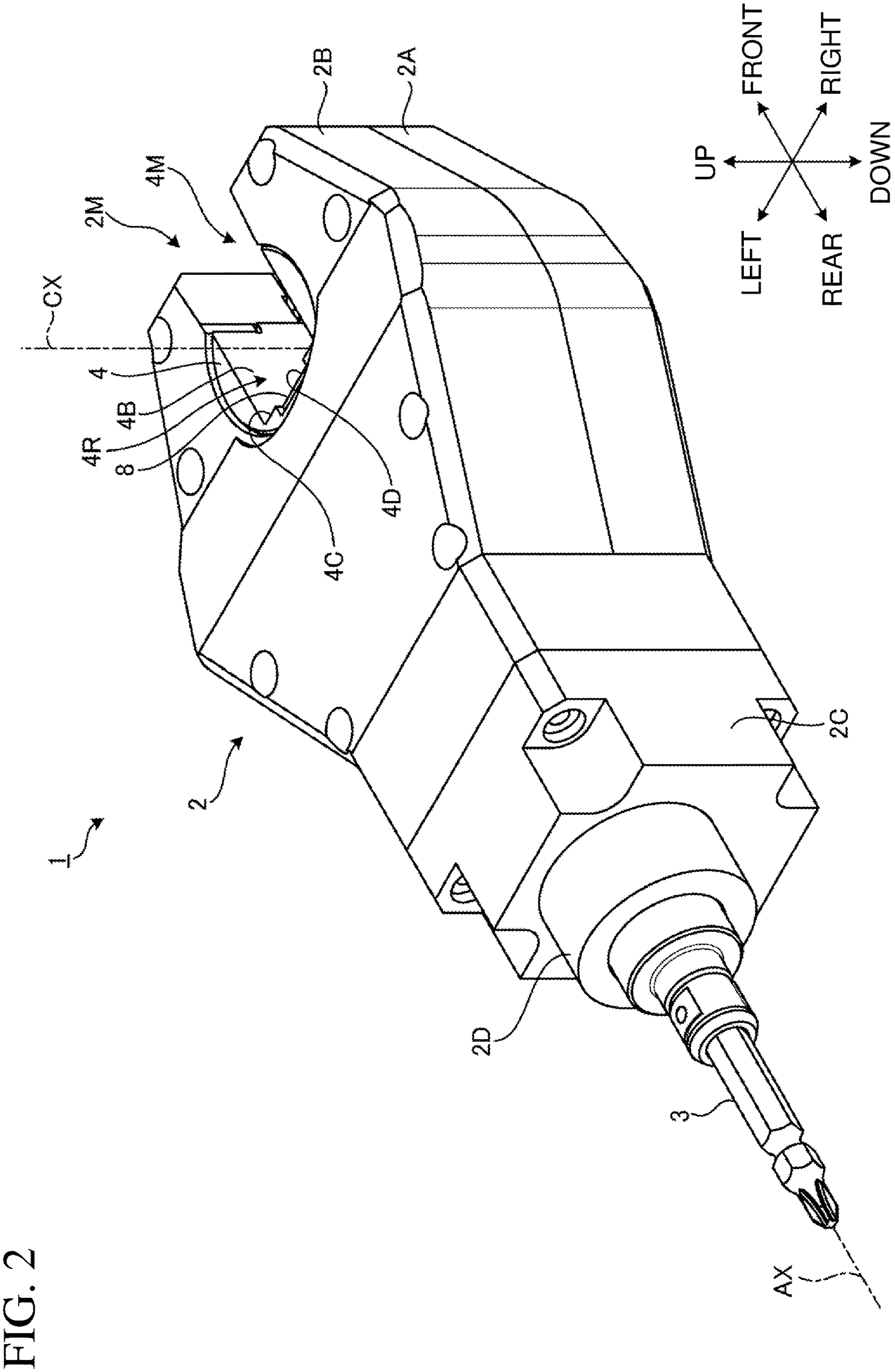
FIG. 2 is a perspective view of the attachment according to the embodiment as viewed from the right rear.
Figure 3:
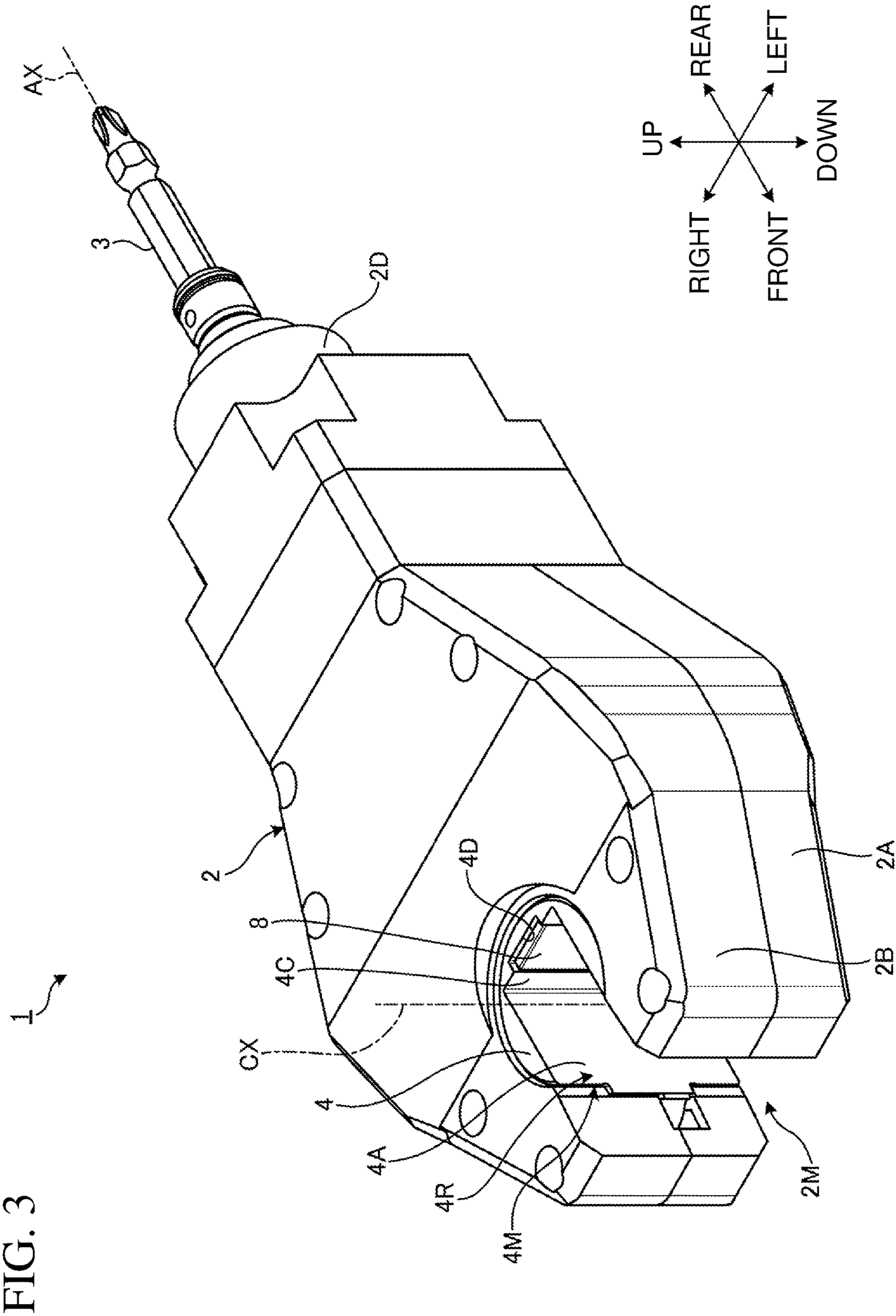
FIG. 3 is a perspective view of the attachment according to the embodiment as viewed from the left front.
Figure 4:
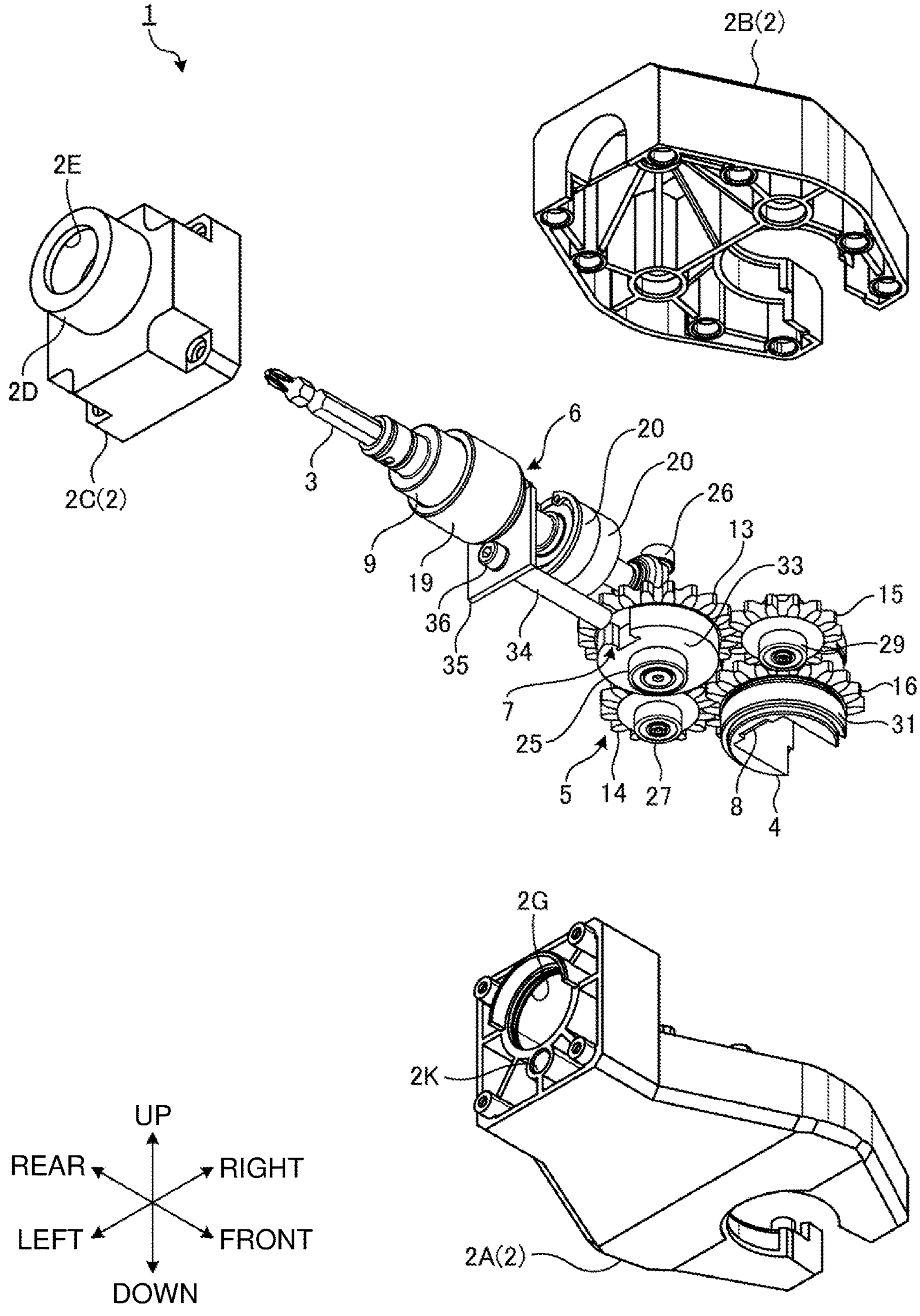
FIG. 4 is an exploded perspective view of the attachment according to the embodiment as viewed from the right rear.
Figure 5:
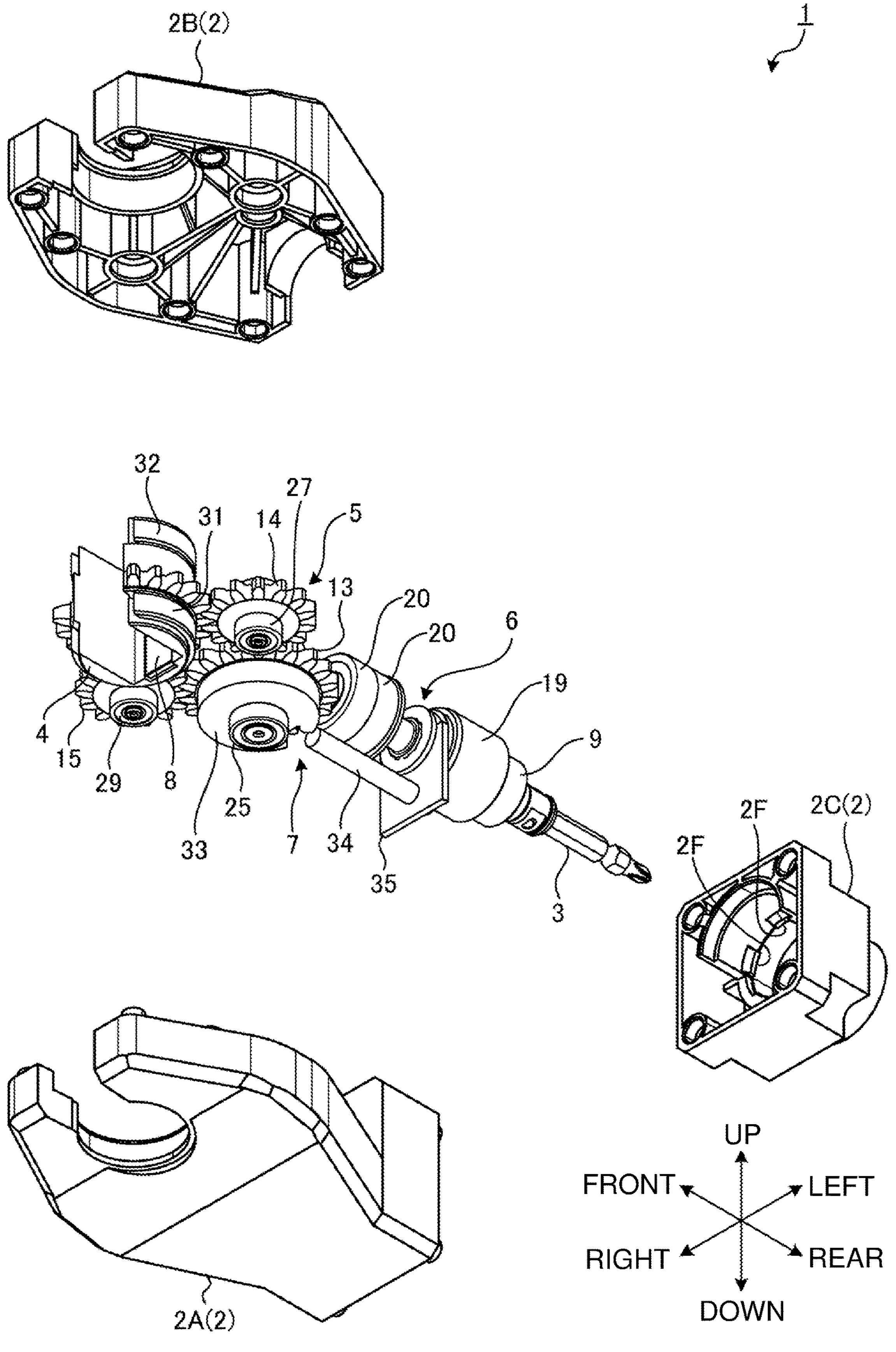
FIG. 5 is an exploded perspective view of the attachment according to the embodiment as viewed from the left front.
Figure 6:
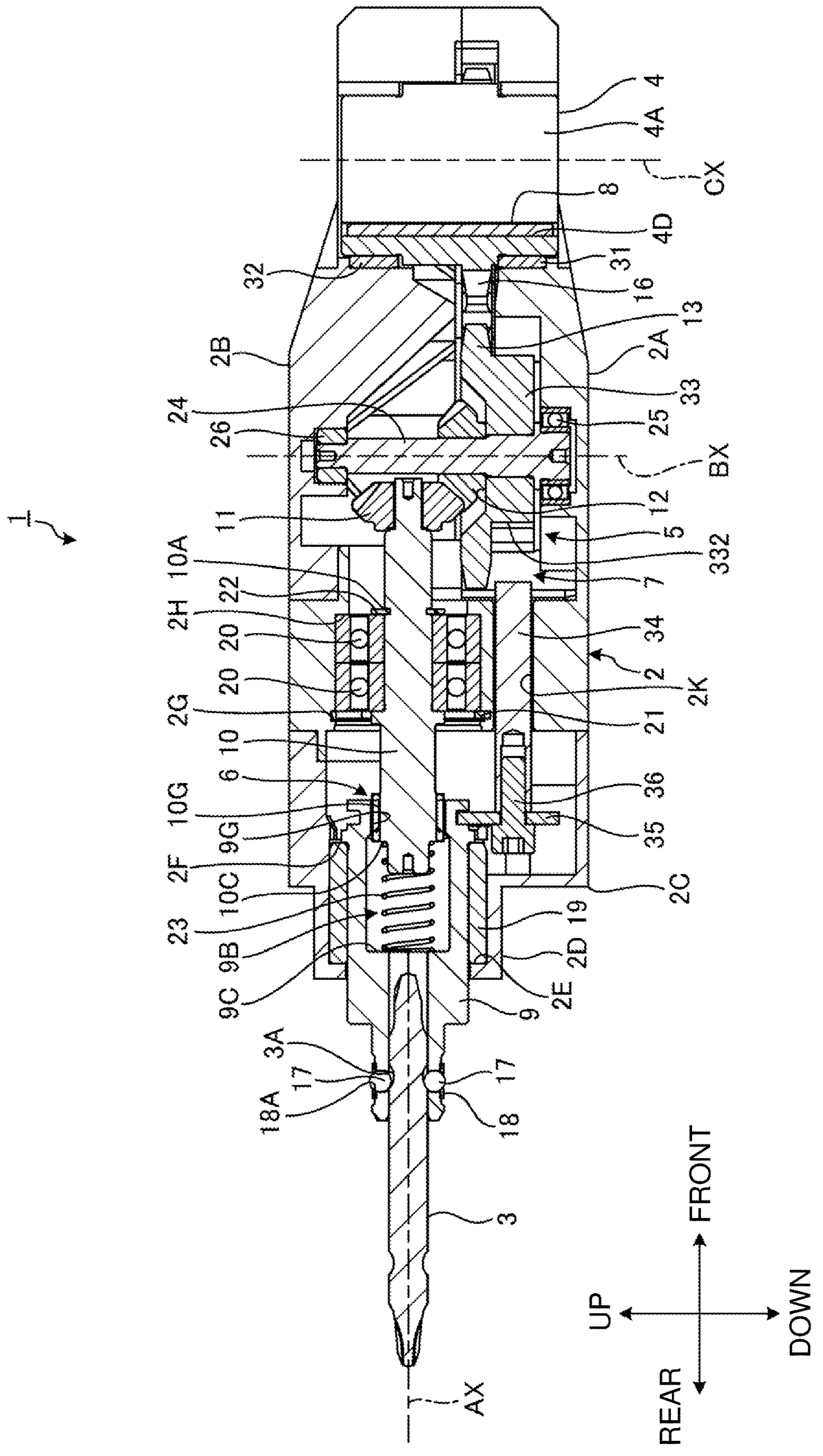
FIG. 6 is a sectional view of the attachment according to the embodiment.

FIG. 2 is a perspective view of the attachment 1 according to the embodiment as viewed from the right rear. FIG. 3 is a perspective view of the attachment 1 as viewed from the left front. FIG. 4 is an exploded perspective view of the attachment 1 as viewed from the right rear. FIG. 5 is an exploded perspective view of the attachment 1 as viewed from the left front. FIG. 6 is a sectional view of the attachment 1.

The attachment 1 includes a housing 2, the input shaft 3, the tip socket 4, a power transmission 5, a power interrupter 6, a front aligner 7, and a magnet 8.

The housing 2 accommodates the power transmission 5, the power interrupter 6, and the front aligner 7. The housing 2 has a housing opening 2M for receiving the post body 201 as a workpiece. The housing 2 includes a lower housing 2A, an upper housing 2B, and a rear housing 2C.

The input shaft 3 is located rearward from the rear housing 2C. The input shaft 3 extends in the front-rear direction. The input shaft 3 received in the tool hole 102 in the power tool 100 is rotatable about the rotation axis AX. The rotation axis AX extends in the front-rear direction.

The tip socket 4 is located at the front end of the housing 2. The tip socket 4 has a socket opening 4M for receiving the post body 201. The tip socket 4 has a recess 4R for receiving the post body 201. The socket opening 4M is located at the front end of the recess 4R. The tip socket 4 surrounding the post body 201 rotates about the rotation axis CX. The rotation axis CX extends vertically.

Figure 7:
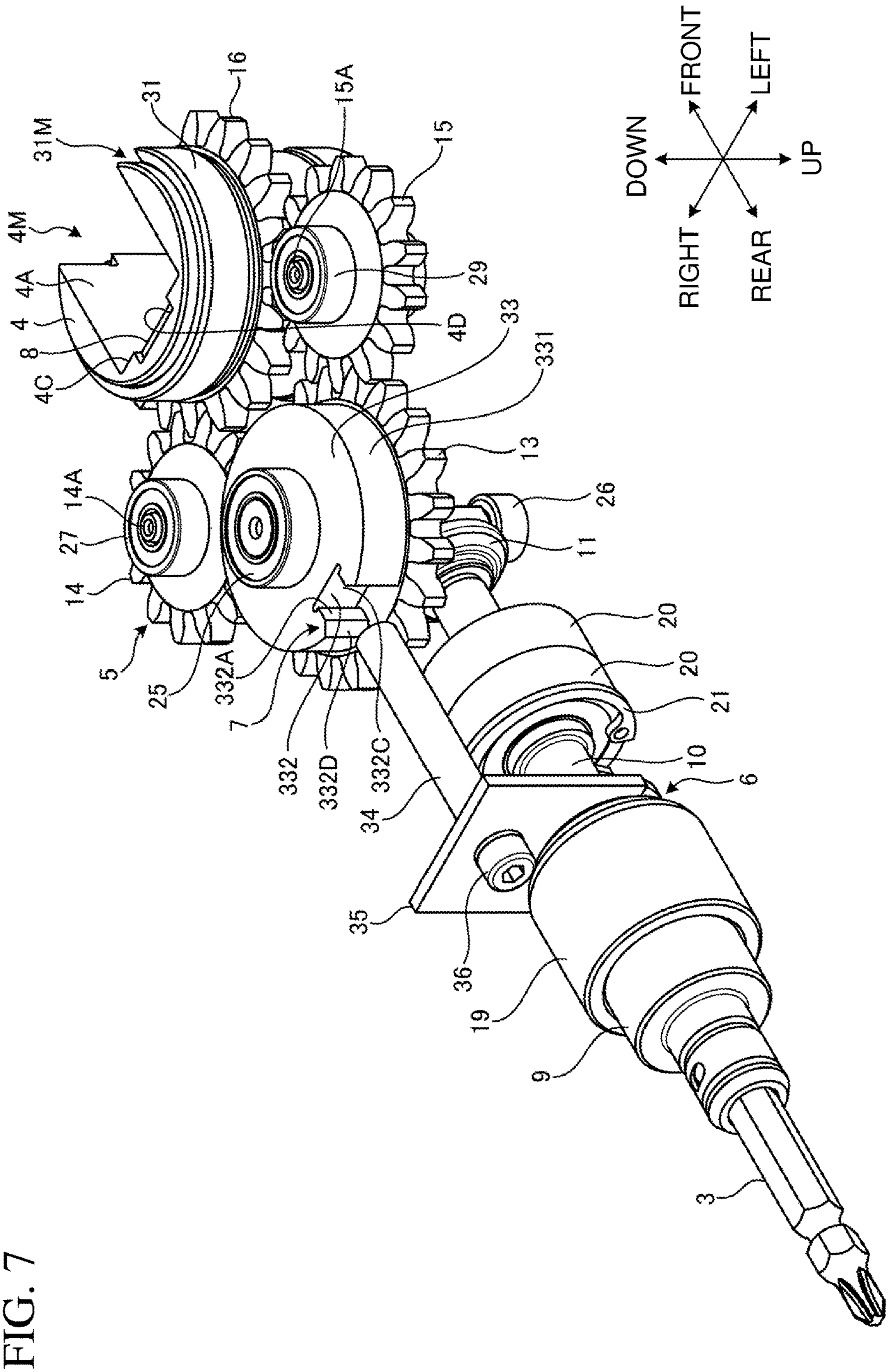
FIG. 7 is a perspective view of an input shaft, a tip socket, a power transmission, a power interrupter, a front aligner, and a magnet in the embodiment as viewed from below.
Figure 8:
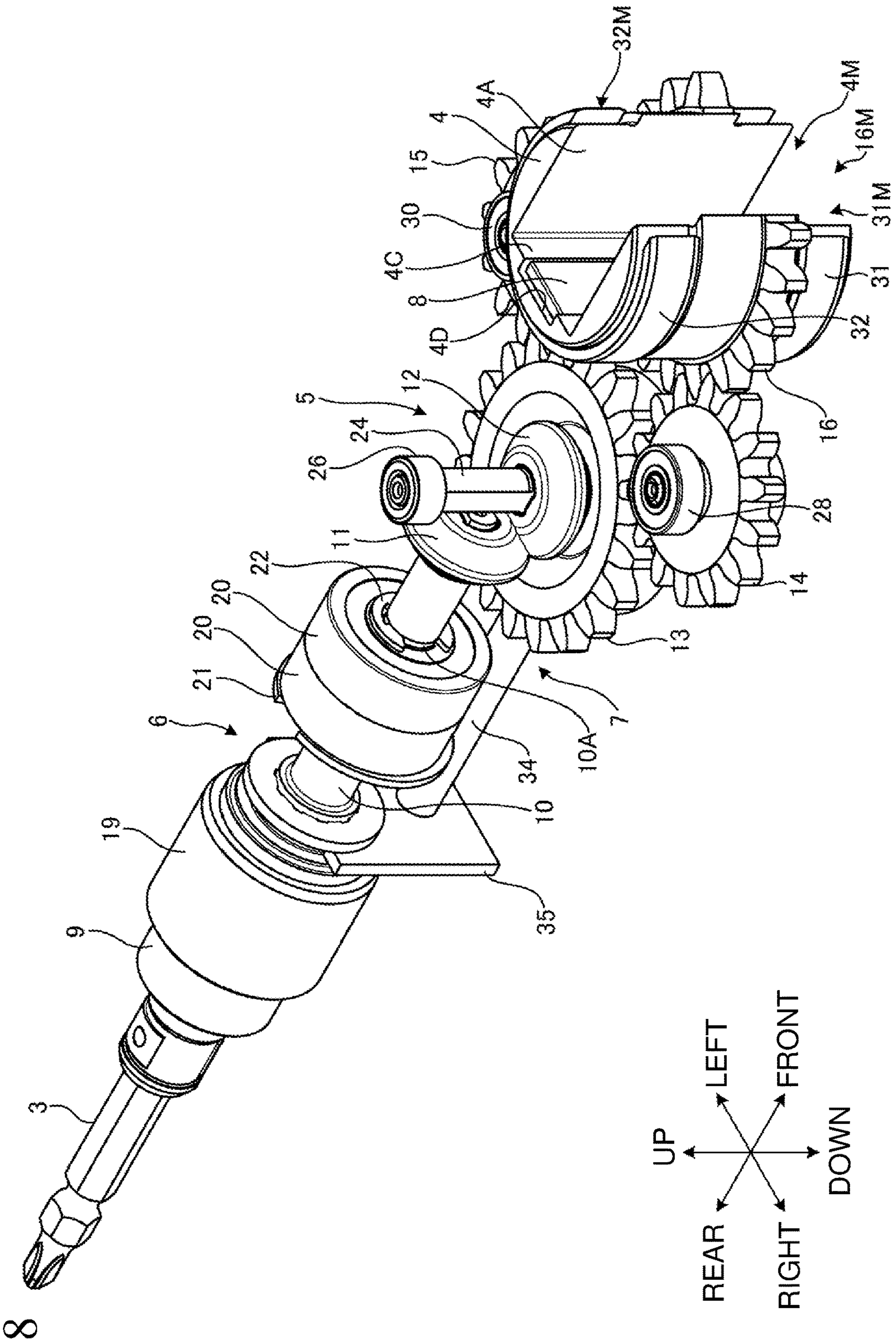
FIG. 8 is a perspective view of the input shaft, the tip socket, the power transmission, the power interrupter, the front aligner, and the magnet in the embodiment as viewed from above.
Figure 9:
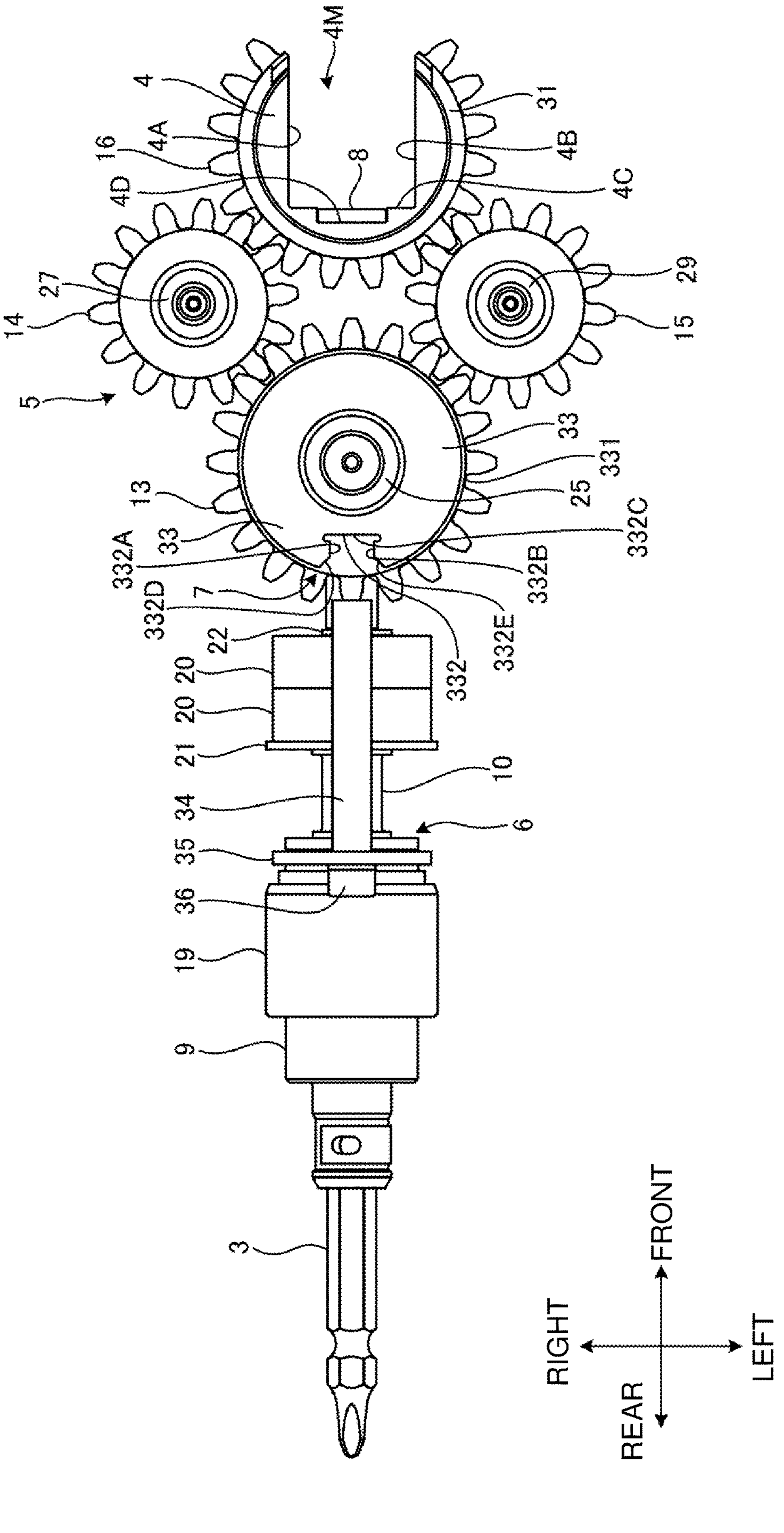
FIG. 9 is a bottom view of the input shaft, the tip socket, the power transmission, the power interrupter, the front aligner, and the magnet in the embodiment.
Figure 10:
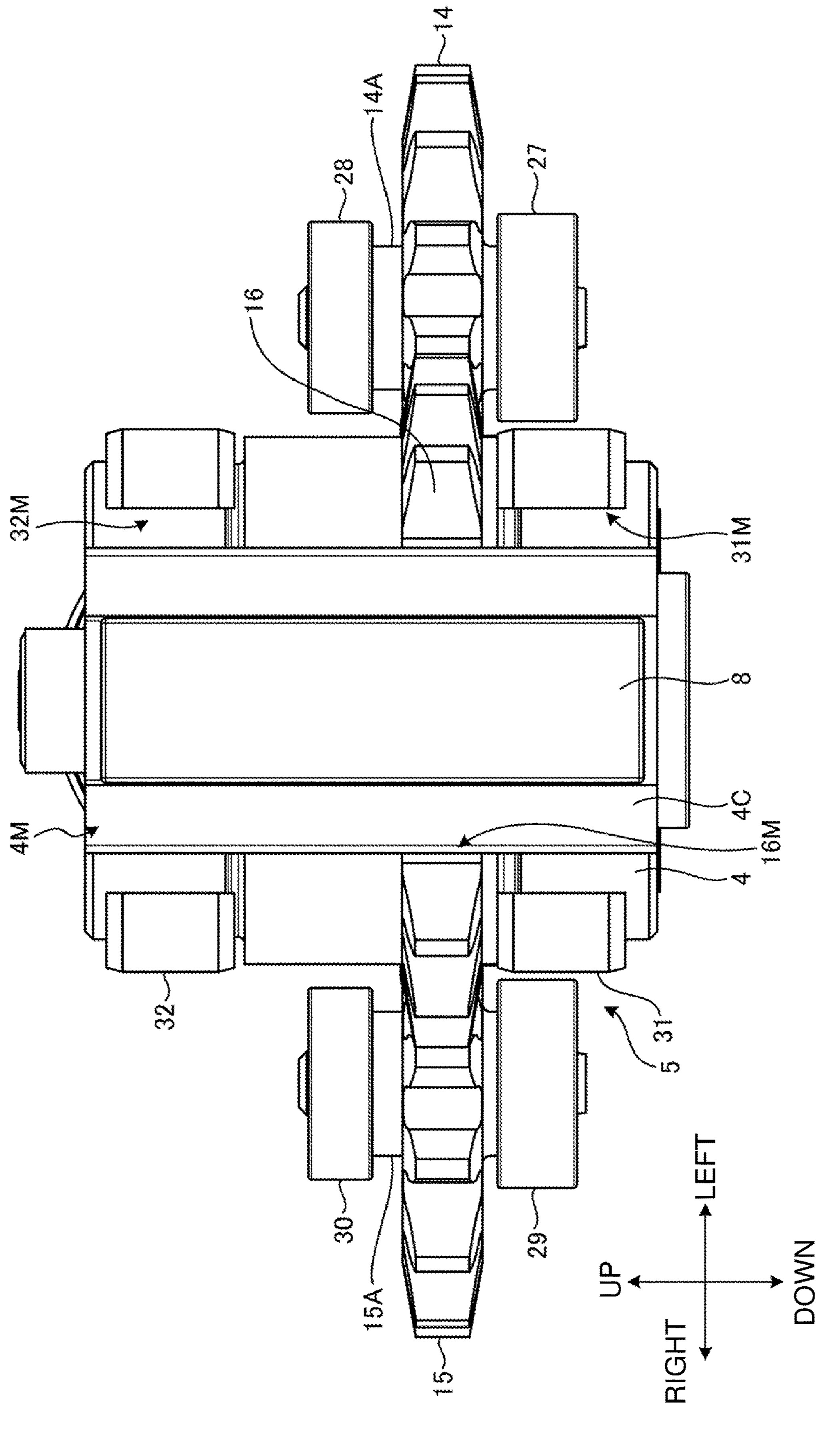
FIG. 10 is a front view of the input shaft, the tip socket, the power transmission, the power interrupter, the front aligner, and the magnet in the embodiment.
Figure 11:
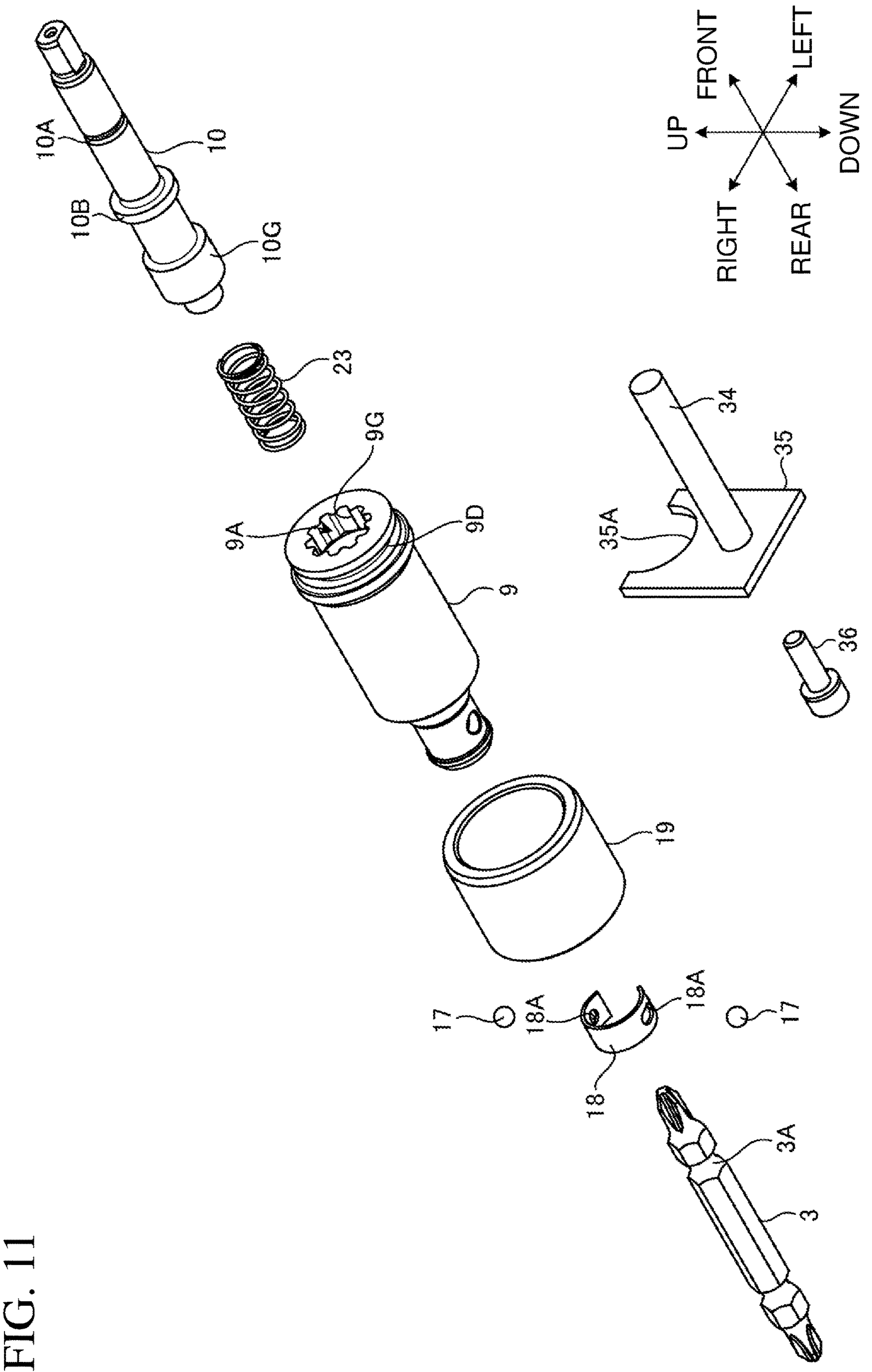
FIG. 11 is a partial exploded perspective view of the input shaft and the power transmission in the embodiment as viewed from the right front.

FIG. 7 is a perspective view of the input shaft 3, the tip socket 4, the power transmission 5, the power interrupter 6, the front aligner 7, and the magnet 8 in the embodiment as viewed from below. FIG. 8 is a perspective view of the input shaft 3, the tip socket 4, the power transmission 5, the power interrupter 6, the front aligner 7, and the magnet 8 as viewed from above. FIG. 9 is a bottom view of the input shaft 3, the tip socket 4, the power transmission 5, the power interrupter 6, the front aligner 7, and the magnet 8. FIG. 10 is a front view of the input shaft 3, the tip socket 4, the power transmission 5, the power interrupter 6, the front aligner 7, and the magnet 8. FIG. 11 is a partial exploded perspective view of the input shaft 3 and the power transmission 5 as viewed from the right front.

The power transmission 5 transmits, to the tip socket 4, power input into the input shaft 3 from the power tool 100. The power transmission 5 transmits a rotational force from the input shaft 3 to the tip socket 4. The power transmission 5 includes a first countershaft 9, a second countershaft 10, a first bevel gear 11, a second bevel gear 12, a third countershaft 24, a spur gear 13, a first intermediate gear 14, a second intermediate gear 15, and an intermittent gear 16.

The first countershaft 9 is connected to the input shaft 3. The first countershaft 9 rotates about the rotation axis AX together with the input shaft 3. The first countershaft 9 and the input shaft 3 are connected together with two balls 17 and a leaf spring 18. The balls 17 are received in a groove 3A located on a front portion of the input shaft 3. The leaf spring 18 covers the balls 17. The leaf spring 18 has openings 18A that receive parts of the balls 17.

The first countershaft 9 is rotatably supported by a bearing 19. The bearing 19 is a slide bearing. The bearing 19 is held in a cylinder 2D in the rear housing 2C. The input shaft 3 is supported by the housing 2 with the first countershaft 9 and the bearing 19 in between. The rear housing 2C includes a support 2E and supports 2F. The support 2E is in contact with the rear end of the bearing 19. The supports 2F are in contact with the front end of the bearing 19. The support 2E and the supports 2F prevent the bearing 19 from moving in the front-rear direction relative to the housing 2. The first countershaft 9 is rotatably supported by the bearing 19 about the rotation axis AX and movable in the front-rear direction relative to the bearing 19. The input shaft 3 and the first countershaft 9 are supported by the housing 2 with the bearing 19 in between in a manner movable in the front-rear direction parallel to the rotation axis AX.

The second countershaft 10 is connected to the first countershaft 9. The second countershaft 10 transmits, to the spur gear 13, power input into the input shaft 3 from the power tool 100. The second countershaft 10 is connected to the first countershaft 9 with splines. The first countershaft 9 has a spline hole 9A for receiving a rear portion of the second countershaft 10. The spline hole 9A has an inner surface with internal spline teeth 9G. The second countershaft 10 includes a rear portion with external spline teeth 10G. The internal spline teeth 9G mesh with the external spline teeth 10G. In this state, the second countershaft rotates about the rotation axis AX together with the first countershaft 9.

The second countershaft 10 is rotatably supported by bearings 20. The bearings 20 are ball bearings. The second countershaft 10 is supported by two bearings 20. The two bearings 20 are arranged in the front-rear direction. The bearing 20 at the rear includes an outer ring having its rear end face supported by a support 2G in the lower housing 2A with a snap ring 21 in between. The bearing 20 at the front includes an outer ring having its front end face supported by a support 2H in the lower housing 2A. The bearing 20 at the front includes an inner ring having its front end face supported by a snap ring 22. The snap ring 22 is received in a groove 10A on a front portion of the second countershaft 10. The support 2G and the support 2H prevent the bearing 20 from moving in the front-rear direction relative to the housing 2.

The second countershaft 10 includes a flange 10B. The flange 10B is in contact with the rear end face of the inner ring in the rear bearing 20. The flange 10B and the snap ring 22 prevent the second countershaft 10 from moving in the front-rear direction relative to the bearing 20.

As described above, the first countershaft 9 is movable in the front-rear direction relative to the bearing 19. With the internal spline teeth 9G meshing with the external spline teeth 10G, the first countershaft 9 can move forward relative to the bearing 19. This movement causes the internal spline teeth 9G to be separate from the external spline teeth 10G. In other words, the forward movement of the first countershaft 9 disengages the splines connecting the internal spline teeth 9G with the external spline teeth 10G.

The first countershaft 9 receives a coil spring 23 in an internal space 9B. The coil spring 23 has its rear end in contact with a support surface 9C in the internal space 9B in the first countershaft 9. The coil spring 23 has its front end in contact with a support surface 10C of the second countershaft 10. The coil spring 23 is compressed between the support surface 9C and the support surface 10C. The coil spring 23 generates an elastic force to move the first countershaft 9 backward.

The first bevel gear 11 is fixed to the front end of the second countershaft 10. The first bevel gear 11 rotates about the rotation axis AX together with the second countershaft 10.

The second bevel gear 12 meshes with the first bevel gear 11. The second bevel gear 12 rotates about a rotation axis BX. The rotation axis BX extends vertically. The second bevel gear 12 is fixed to the third countershaft 24. The third countershaft 24 extends vertically. The third countershaft 24 rotates about the rotation axis BX together with the second bevel gear 12. The third countershaft 24 has its lower end rotatably supported by a bearing 25 and its upper end rotatably supported by a bearing 26. The bearing 25 is held on the lower housing 2A. The bearing 26 is held on the upper housing 2B. The second bevel gear 12 rotates as the first bevel gear 11 rotates. The third countershaft 24 rotates together with the second bevel gear 12.

The spur gear 13 is fixed to the third countershaft 24. The spur gear 13 is located below the second bevel gear 12. The spur gear 13 rotates about the rotation axis BX. The spur gear 13 rotates together with the third countershaft 24 as the second bevel gear 12 and the third countershaft 24 rotate.

Each of the first intermediate gear 14 and the second intermediate gear 15 meshes with the spur gear 13. The first intermediate gear 14 is located rightward from the second intermediate gear 15. The first intermediate gear 14 and the second intermediate gear 15 each rotate about a rotation axis extending vertically. A shaft 14A is fixed to the first intermediate gear 14. A shaft 15A is fixed to the second intermediate gear 15. The shaft 14A has its lower end rotatably supported by a bearing 27 and its upper end rotatably supported by a bearing 28. The shaft 15A has its lower end rotatably supported by a bearing 29 and its upper end rotatably supported by a bearing 30. The bearing 27 and the bearing 29 are held on the lower housing 2A. The bearing 28 and the bearing 30 are held on the upper housing 2B.

The first intermediate gear 14 and the second intermediate gear 15 rotate as the spur gear 13 rotates.

The intermittent gear 16 is located on the outer circumferential surface of the tip socket 4. The intermittent gear 16 is fixed to the tip socket 4. The intermittent gear 16 may be integral with the tip socket 4. The intermittent gear 16 meshes with at least one of the first intermediate gear 14 or the second intermediate gear 15. The spur gear 13 connects to the intermittent gear 16 with at least one of the first intermediate gear 14 or the second intermediate gear 15 in between. The intermittent gear 16 has a gear opening 16M through which the post body 201 is received. The socket opening 4M aligns with the gear opening 16M in the circumferential direction of the rotation axis CX.

The intermittent gear 16 rotates about the rotation axis CX as the first intermediate gear 14 and the second intermediate gear 15 rotate. This causes the tip socket 4 fixed to the intermittent gear 16 to rotate about the rotation axis CX together with the intermittent gear 16.

The intermittent gear 16 with the gear opening 16M has a period in which the intermittent gear 16 cannot mesh with the first intermediate gear 14 while rotating. In this period, the intermittent gear 16 meshes with the second intermediate gear 15. The intermittent gear 16 thus receives a rotational force from the spur gear 13 through the second intermediate gear 15. Similarly, the intermittent gear 16 has a period in which the intermittent gear 16 cannot mesh with the second intermediate gear 15 while rotating. In this period, the intermittent gear 16 meshes with the first intermediate gear 14. The intermittent gear 16 thus receives the rotational force from the spur gear 13 through the first intermediate gear 14. With at least one of the first intermediate gear 14 or the second intermediate gear 15 meshing with the intermittent gear 16, the intermittent gear 16 receives the rotational force from the spur gear 13.

The tip socket 4 is rotatably supported by bearings 31 and 32. The bearing 31 supports a lower portion of the tip socket 4 in a rotatable manner. The bearing 32 supports an upper portion of the tip socket 4 in a rotatable manner. The bearing 31 is held on the lower housing 2A. The bearing 32 is held on the upper housing 2B. The tip socket 4 is rotatably supported by the housing 2 with the bearings 31 and 32 in between.

The bearing 31 is partially cut and has a bearing opening 31M through which the post body 201 is received. The bearing 32 is partially cut and has a bearing opening 32M through which the post body 201 is received.

The power interrupter 6 can interrupt power transmitted from the input shaft 3 to the tip socket 4. The power interrupter 6 includes the internal spline teeth 9G and the external spline teeth 10G. The power interrupter 6 interrupts power transmitted from the input shaft 3 to the tip socket 4 by disengaging the splines connecting the first countershaft 9 and the second countershaft 10. With the internal spline teeth 9G meshing with the external spline teeth 10G, the power tool 100 rotates the input shaft 3 and the first countershaft 9 to cause the second countershaft 10 to rotate together with the first countershaft 9. Thus, the tip socket 4 receives a rotational force input into the input shaft 3 through the power transmission 5. With the input shaft 3 in the tool hole 102 and the tip socket 4 surrounding the post body 201, the operator moves the power tool 100 forward and pushes the power tool 100 against the attachment 1. The first countershaft 9 is movable in the front-rear direction relative to the bearing 19. As the power tool 100 is moved forward and pushed against the attachment 1, the input shaft 3 and the first countershaft 9 move forward relative to the bearing 19. With the internal spline teeth 9G meshing with the external spline teeth 10G, the first countershaft 9 moving forward relative to the bearing 19 causes the internal spline teeth 9G to move forward from the external spline teeth 10G. This disengages the splines connecting the internal spline teeth 9G with the external spline teeth 10G. In other words, the forward movement of the input shaft 3 and the first countershaft 9 disengages the splines connecting the first countershaft 9 with the second countershaft 10. Thus, the second countershaft 10 does not rotate although the power tool 100 rotates the input shaft 3 and the first countershaft 9. This interrupts transmission of a rotational force input into the input shaft 3 to the tip socket 4.

The front aligner 7 aligns the socket opening 4M of the recess 4R with the housing opening 2M and stops the rotation of the tip socket 4. The front aligner 7 adjusts the position of the tip socket 4 in the circumferential direction of the rotation axis CX to align the socket opening 4M of the recess 4R with the housing opening 2M.

The front aligner 7 operates in synchronization with the power interrupter 6 interrupting power to align the socket opening 4M of the recess 4R with the housing opening 2M and to stop the rotation of the tip socket 4. In response to the power interrupter 6 interrupting the transmission of power, the front aligner 7 adjusts the position of the tip socket 4 in the circumferential direction of the rotation axis CX to align the socket opening 4M of the recess 4R with the housing opening 2M.

The front aligner 7 includes a rotary member 33 and a movable member 34. The rotary member 33 is fixed to the spur gear 13. The movable member 34 is movable in the front-rear direction together with the input shaft 3 and the first countershaft 9.

The rotary member 33 is substantially a disk. The rotary member 33 is located below the spur gear 13. The rotary member 33 is also fixed to the third countershaft 24. The rotary member 33 and the spur gear 13 may be an integral member (one piece). The rotary member 33 rotates about the rotation axis CX together with the third countershaft 24 and the spur gear 13.

The rotary member 33 has an outer circumferential surface 331 and a cutout 332. The cutout 332 is located in the outer circumferential surface 331. The cutout 332 is recessed from a part of the outer circumferential surface 331 toward the center of the rotary member 33 (toward the rotation axis CX).

The cutout 332 has, as its inner surfaces, a first side surface 332A, a second side surface 332B, a contact surface 332C, a first tapered surface 332D, and a second tapered surface 332E. The second side surface 332B faces the first side surface 332A. The contact surface 332C connects the inner ends of the first side surface 332A and the second side surface 332B. The first tapered surface 332D connects the outer end of the first side surface 332A and the outer circumferential surface 331. The second tapered surface 332E connects the outer end of the second side surface 332B and the outer circumferential surface 331.

The movable member 34 is a rod elongated in the front-rear direction. The movable member 34 includes its front end located frontward from the front end of the first countershaft 9. The movable member 34 is connected to the first countershaft 9 with a connector 35. The connector 35 in the embodiment is a plate. The movable member 34 is fastened to the connector 35 with a screw 36. The connector 35 has an arc 35A at its upper end. The arc 35A is recessed downward from the upper end of the connector 35. The arc 35A is received in a groove 9D located on a front portion of the outer circumferential surface of the first countershaft 9.

The relative positions between the first countershaft 9 and the movable member 34 remain unchanged. The movable member 34 moves in the front-rear direction together with the input shaft 3 and the first countershaft 9. The movable member 34 moves forward as the input shaft 3 and the first countershaft 9 move forward. The movable member 34 moves backward as the input shaft 3 and the first countershaft 9 move backward. The lower housing 2A has a guide hole 2K for receiving the movable member 34. The movable member 34 is movable in the front-rear direction along the guide hole 2K.

With the input shaft 3 and the first countershaft 9 moving forward, the movable member 34 has its front end placed into the cutout 332 in the rotary member 33. In synchronization with the power interrupter 6 interrupting power, the movable member 34 has its front end placed into the cutout 332 in the rotary member 33.

As described above, with the input shaft 3 in the tool hole 102 and the tip socket 4 surrounding the post body 201, the operator moves the power tool 100 forward and pushes the power tool 100 against the attachment 1. The rotary member 33 has a period in which the front end of the movable member 34 faces the outer circumferential surface 331 of the rotary member 33 while rotating and a period in which the front end of the movable member 34 faces the cutout 332 in the rotary member 33 while rotating. For the period in which the front end of the movable member 34 faces the outer circumferential surface 331 of the rotary member 33, forward movement of the first countershaft 9 is prevented by the movable member 34 with its front end in contact with the outer circumferential surface 331 of the rotary member 33. For the period in which the front end of the movable member 34 faces the cutout 332 in the rotary member 33, forward movement of the first countershaft 9 causes the front end of the movable member 34 to be placed into the cutout 332. The first countershaft 9 can thus move forward.

With the first countershaft 9 moving forward, the splines are disengaged to interrupt transmission of power from the first countershaft 9 to the second countershaft 10. With its front end placed into the cutout 332, the movable member 34 prevents the rotary member 33 from rotating. This prevents the spur gear 13, the first intermediate gear 14, the second intermediate gear 15, and the intermittent gear 16 from rotating. The intermittent gear 16 is prevented from rotating. This causes the tip socket 4 to stop rotating. In synchronization with the power interrupter 6 interrupting power, the movable member 34 has its front end placed into the cutout 332 in the rotary member 33, stopping the rotation of the tip socket 4 with the socket opening 4M aligned with the housing opening 2M.

In the embodiment, the spur gear 13 has as many teeth as the intermittent gear 16 without the gear opening 16M. In other words, the spur gear 13 has the same rotation ratio as the intermittent gear 16. To align the socket opening 4M in the tip socket 4 with the housing opening 2M when the tip socket 4 stops rotating in response to the front end of the movable member 34 placed into the cutout 332, the initial positions of the rotary member 33 and the tip socket 4 in their rotational directions are adjusted in advance. Thus, the operator can simply push the power tool 100 forward to align the socket opening 4M in the tip socket 4 with the housing opening 2M.

The tip socket 4 includes the magnet 8. The magnet 8 is located on an inner surface of the recess 4R in the tip socket 4. The recess 4R has, as its inner surfaces, a first side surface 4A, a second side surface 4B, and a rear surface 4C. The second side surface 4B faces the first side surface 4A with a space in between. The rear surface 4C connects the rear ends of the first side surface 4A and the second side surface 4B. The socket opening 4M is located between the front ends of the first side surface 4A and the second side surface 4B.

The magnet 8 is a plate. The magnet 8 has a substantially rectangular parallelepiped profile. The magnet 8 has a front surface (surface) located between the rear ends of the first side surface 4A and the second side surface 4B. The magnet 8 is located on the rear surface 4C. The magnet 8 in the embodiment is located in a recess 4D on the rear surface 4C. The rear surface 4C is substantially flush with the front surface of the magnet 8 in the recess 4D.

With the magnet 8 located inside the tip socket 4, the tip socket 4 attracts the post body 201 with a magnetic force from the magnet 8 when the post body 201 is placed into the tip socket 4. This reduces rattling between the tip socket 4 and the post body 201. The magnet 8 can, for example, align the rotation axis AX of the tip socket 4 with the central axis of the post body 201. The attachment 1 can rotate the post body 201 with the tip socket 4 and the post body 201 having less axial misalignment between them.

The magnet 8 is located on the rear surface 4C. In other words, the magnet 8 is distant from the socket opening 4M. Thus, when the post body 201 is placed into the tip socket 4 through the socket opening 4M, the post body 201 is attracted to the magnet 8 after being placed deep into the tip socket. When the magnet 8 is located, for example, near the socket opening 4M, the post body 201 may be attracted by the magnet 8 before being placed deep into the tip socket 4 and may not be smoothly placed deep into the tip socket 4. In the embodiment, with the magnet 8 distant from the socket opening 4M, the post body 201 is attracted to the tip socket 4 with the magnet 8 after being placed deep into the tip socket 4.

The first side surface 4A, the second side surface 4B, and the rear surface 4C are parallel to the rotation axis CX. The first side surface 4A has a substantially rectangular profile. The second side surface 4B has a substantially rectangular profile. The rear surface 4C has a substantially a rectangular profile. The first side surface 4A has a greater dimension in the vertical direction parallel to the rotation axis CX than in the front-rear direction perpendicular to the rotation axis CX. The second side surface 4B has a greater dimension in the vertical direction parallel to the rotation axis CX than in the front-rear direction perpendicular to the rotation axis CX. The rear surface 4C has a greater dimension in the vertical direction parallel to the rotation axis CX than in the lateral direction perpendicular to the rotation axis CX. In other words, the first side surface 4A has a vertically elongated rectangular profile. The second side surface 4B has a vertically elongated rectangular profile. The rear surface 4C has a vertically elongated rectangular profile. The recess 4R with vertically elongated inner surfaces reduces rattling between the tip socket 4 and the post body 201 held by the tip socket 4. This structure can also align the rotation axis CX of the tip socket 4 with the center axis of the post body 201. The attachment 1 can rotate the post body 201 with the tip socket 4 and the post body 201 having less axial misalignment between them.

Figure 12:
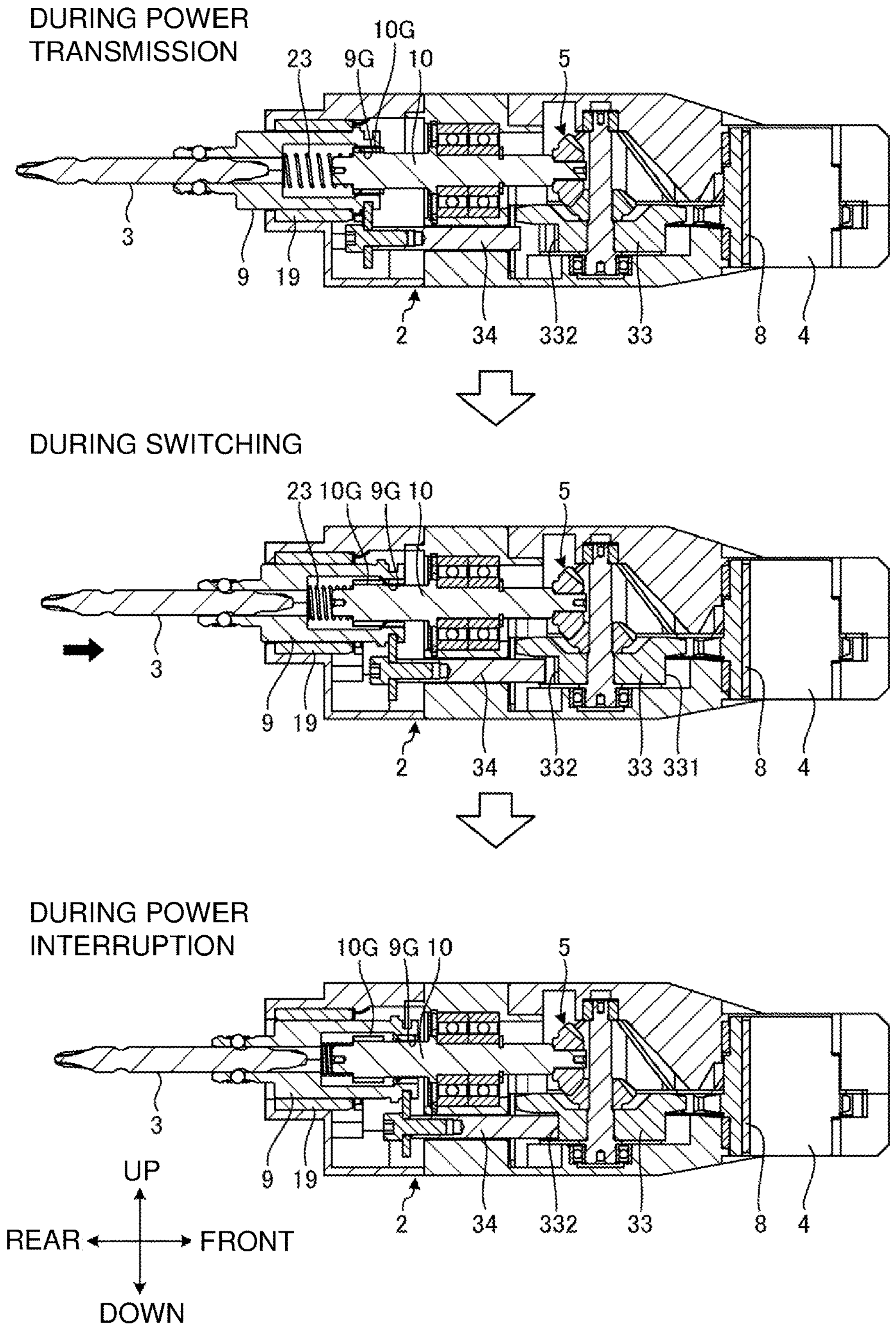
FIG. 12 is a sectional view of the attachment according to the embodiment showing its operation.
Figure 13:
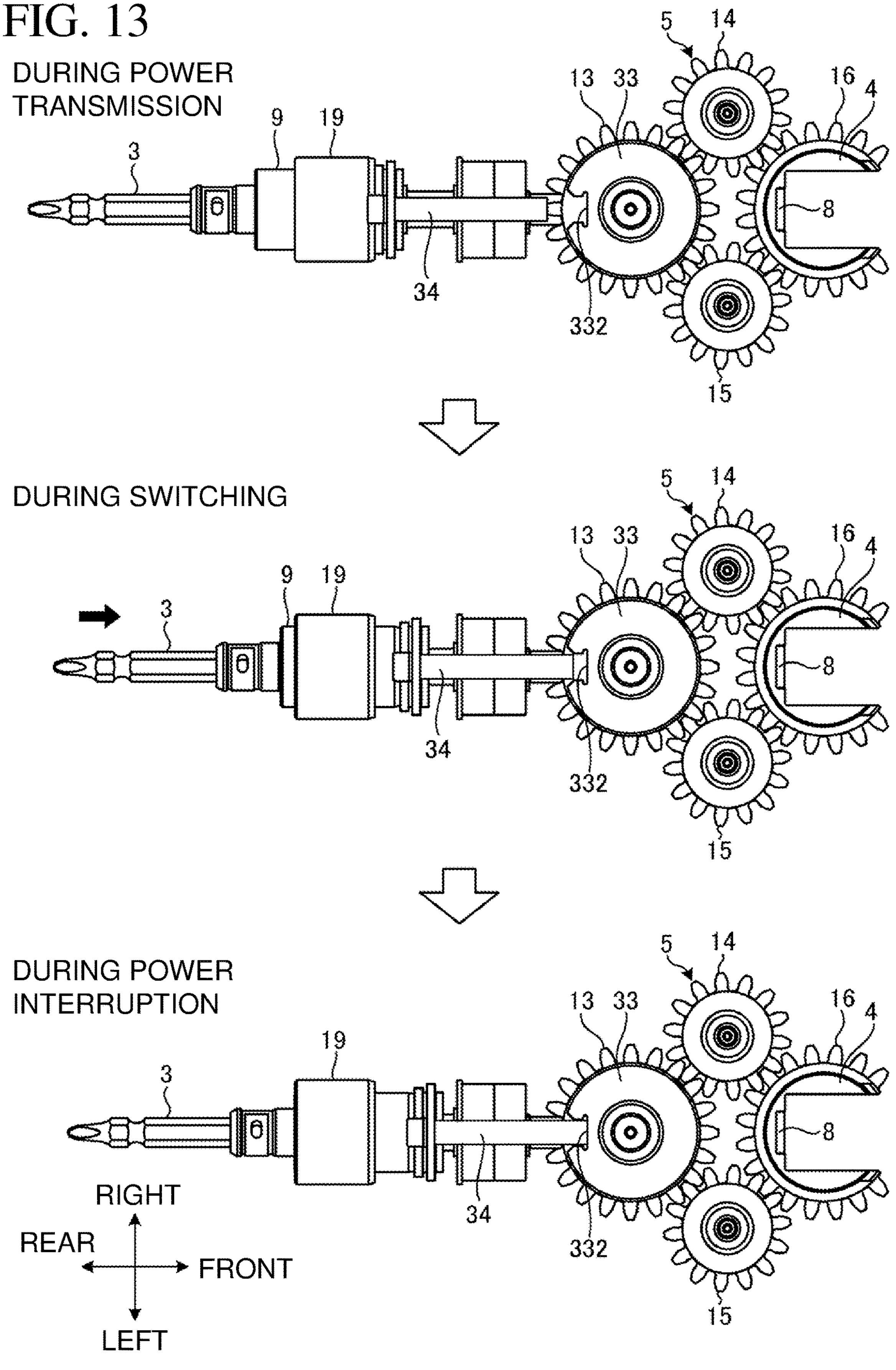
FIG. 13 is a bottom view of the input shaft, the tip socket, the power transmission, the power interrupter, the front aligner, and the magnet showing their operations.

FIG. 12 is a cross-sectional view of the attachment 1 according to the embodiment showing its operation. FIG. 13 is a bottom view of the input shaft 3, the tip socket 4, the power transmission 5, the power interrupter 6, the front aligner 7, and the magnet 8 showing their operations.

With the input shaft 3 and the first countershaft 9 pulled backward, the operator places the input shaft 3 into the tool hole 102 in the power tool 100 and places the tip socket 4 to surround the post body 201. In this state, the operator operates the trigger switch in the power tool 100. This rotates the output shaft 101 in the power tool 100, and rotates the input shaft 3 and the first countershaft 9.

When power is transmitted with the input shaft 3 and the first countershaft 9 pulled backward, the internal spline teeth 9G on the first countershaft 9 mesh with the external spline teeth 10G on the second countershaft 10. Thus, the rotation of the first countershaft 9 is transmitted to the second countershaft 10. The power input from the power tool 100 into the input shaft 3 is transmitted to the tip socket 4 through the power transmission 5. During the transmission of power, rotation of the rotary member 33 is not restricted by the movable member 34, which is separate from the rotary member 33. The post body 201 rotates as the tip socket 4 rotates. This adjusts the length of the steel post 200.

The post body 201 rotates smoothly under an attractive force from the magnet 8 with less rattling between the post body 201 and the tip socket 4. The tip socket 4 rotates stably.

After the length of the steel post 200 is adjusted, the operator pushes the power tool 100 forward to move the input shaft 3 and the first countershaft 9 forward to stop the rotation of the tip socket 4. During switching in which the input shaft 3 and the first countershaft 9 move forward, the internal spline teeth 9G move forward from the external spline teeth 10G. The front end of the movable member 34 approaches the rotary member 33. For the period in which the front end of the movable member 34 faces the outer circumferential surface 331 of the rotary member 33 while the rotary member 33 is rotating, the movable member 34 has its front end in contact with the outer circumferential surface 331 of the rotary member 33, thus preventing the movable member 34 from moving forward. This prevents the input shaft 3 and the first countershaft 9 from moving forward.

With the operator continuously pushing the power tool 100 forward, the rotary member 33 may rotate to cause the front end of the movable member 34 to face the cutout 332 in the rotary member 33, thus allowing the movable member 34 to move forward. As the movable member 34 moves forward and the input shaft 3 and the first countershaft 9 move forward, the internal spline teeth 9G move forward from the external spline teeth 10G. This disengages the splines connecting the internal spline teeth 9G and the external spline teeth 10G. With the splines connecting the internal spline teeth 9G and the external spline teeth 10G disengaged for power interruption, the power tool 100 does not transmit power to the tip socket 4 although the input shaft 3 and the first countershaft 9 continue to rotate. In synchronization with the disengagement of the splines connecting the internal spline teeth 9G and the external spline teeth 10G, the movable member 34 has its front end placed into the cutout 332. This stops the rotation of the rotary member 33. This also stops the rotation of the tip socket 4. The socket opening 4M are aligned with the housing opening 2M when the tip socket 4 stops rotating. Thus, the operator can readily remove the attachment 1 from the post body 201 by pulling the attachment 1.

The attachment 1 according to the embodiment includes the input shaft 3 rotatable about the rotation axis AX being the first rotation axis to receive power input from the power tool 100, the tip socket 4 including the recess 4R having the socket opening 4M, the housing 2 having the housing opening 2M to receive the post body 201 as a workpiece and supporting the tip socket 4 in a rotatable manner, the power transmission 5 that transmits, to the tip socket 4, power input into the input shaft 3, and the front aligner 7 that stops the rotation of the tip socket 4 with the socket opening 4M being aligned with the housing opening 2M.

In the structure described above, the post body 201 is placed into the recess 4R in the tip socket 4 through the housing opening 2M and the socket opening 4M. Power is input into the input shaft 3 to rotate the tip socket 4. This rotates the post body 201 and adjusts the length of the steel post 200. With the length of the steel post 200 adjusted, the front aligner 7 is operated to stop the rotation of the tip socket 4 with the socket opening 4M aligned with the housing opening 2M. Thus, the operator can readily remove the attachment 1 from the post body 201 by pulling the attachment 1. This structure can avoid prolonged operation time.

The attachment 1 according to the embodiment includes the power interrupter 6 that interrupts power. The front aligner 7 stops the rotation of the tip socket 4 in synchronization with interruption of the power performed by the power interrupter 6 with the socket opening 4M of the recess 4R aligned with the housing opening 2M.

With the length of the steel post 200 adjusted, the power interrupter 6 operates in synchronization with the front aligner 7 to reduce reaction torque received by the operator from the attachment 1 in stopping the tip socket 4.

The power transmission 5 in the embodiment includes the intermittent gear 16 on the outer circumferential surface of the tip socket 4, and the spur gear 13 coupled to the intermittent gear 16 and having as many teeth as the intermittent gear 16. The front aligner 7 includes the rotary member 33 fixed to the spur gear 13 and having the cutout 332, and the movable member 34 receivable in the cutout 332 in synchronization with power interruption.

In the structure described above, the spur gear 13 stops rotating when the cutout 332 receives the movable member 34. With the intermittent gear 16 having as many teeth as the spur gear 13, the rotation stop of the spur gear 13 causes the intermittent gear 16 to stop rotating with the socket opening 4M aligned with the housing opening 2M.

The power transmission 5 in the embodiment includes the first countershaft 9 connected to the input shaft 3 and rotatable with the input shaft 3, and the second countershaft 10 connected to the first countershaft 9 with splines to transmit, to the spur gear 13, power input into the input shaft 3. The power interrupter 6 disengages the splines.

In the structure described above, the splines are disengaged to interrupt power transmitted from the input shaft 3 to the tip socket 4.

The attachment 1 according to the embodiment includes the bearing 19 being a slide bearing supported by the housing 2 and supporting the first countershaft 9. The input shaft 3 and the first countershaft 9 are movable in the front-rear direction parallel to the rotation axis AX. The input shaft 3 moves forward and the first countershaft 9 moves forward to disengage the splines connecting the first countershaft 9 and the second countershaft 10.

In the structure described above, the operator pushes the power tool 100 forward to move the input shaft 3 and the first countershaft 9 forward. This disengages the splines.

The movable member 34 in the embodiment moves in the front-rear direction with the input shaft 3 and the first countershaft 9. The input shaft 3 moves forward and the first countershaft 9 moves forward to cause the movable member 34 to be placed into the cutout 332.

The operator pushes the power tool 100 forward to move the input shaft 3 and the first countershaft 9 forward. This causes the movable member 34 to be placed into the cutout 332, stopping the rotation of the intermittent gear 16 with the socket opening 4M aligned with the housing opening 2M.

The power transmission 5 in the embodiment includes the first intermediate gear 14 and the second intermediate gear 15 each meshing with the spur gear 13. The spur gear 13 is coupled to the intermittent gear 16 with at least one of the first intermediate gear 14 or the second intermediate gear 15 in between. The spur gear 13 rotates with at least one of the first intermediate gear 14 or the second intermediate gear 15 meshing with the intermittent gear 16.

In the structure described above, the intermittent gear 16 meshes with the second intermediate gear 15 for the period in which the intermittent gear 16 cannot mesh with the first intermediate gear 14 while rotating. The intermittent gear 16 thus receives a rotational force from the spur gear 13 through the second intermediate gear 15. Similarly, the intermittent gear 16 meshes with the first intermediate gear 14 for the period in which the intermittent gear 16 cannot mesh with the second intermediate gear 15. The intermittent gear 16 thus receives the rotational force from the spur gear 13 through the first intermediate gear 14.

The attachment 1 according to the embodiment includes the magnet 8 on the inner surface of the recess 4R.

In the structure described above, the post body 201 is attracted to the inner surface of the recess 4R. The tip socket 4 is then less likely to rotate without the rotation axis CX being the second rotation axis of the tip socket 4 aligned with the center axis of the post body 201. The attachment 1 can thus rotate the post body 201 stably.

The recess 4R in the embodiment has multiple inner surfaces including the first side surface 4A and the second side surface 4B facing the first side surface 4A with a space in between. The socket opening 4M is located between the front end (first end) of the first side surface 4A and the front end (first end) of the second side surface 4B. The magnet 8 has a surface (front surface) located between a second end of the first side surface 4A and a second end of the second side surface 4B.

In the structure described above, the magnet 8 is located on the rear surface 4C of the recess 4R. Thus, when the post body 201 is placed into the recess 4R through the socket opening 4M, the post body 201 is less likely to be attracted to at least one of the first side surface 4A or the second side surface 4B. The post body 201 is attracted by the magnet 8 after being placed deep into the recess 4R to avoid lower operability in placing the post body 201 into the tip socket 4.

The first side surface 4A, the second side surface 4B, and the rear surface 4C are parallel to the rotation axis CX of the tip socket 4. The first side surface 4A, the second side surface 4B, and the rear surface 4C each have a greater dimension in the direction parallel to the second rotation axis than in the direction perpendicular to the second rotation axis.

Thus, the tip socket 4 is less likely to rotate without the center axis of the post body 201 aligned with the rotation axis CX of the tip socket 4. The attachment 1 can thus rotate the post body 201 stably.

Other Embodiments

In the embodiment described above, the workpiece held by the tip socket 4 may not be the post body 201 and may be, for example, a turnbuckle or a locknut.

REFERENCE SIGNS LIST

1 attachment
2 housing
2A lower housing
2B upper housing
2C rear housing
2D cylinder
2E support
2F support
2G support
2H support
2K guide hole
2M housing opening
3 input shaft
3A groove
4 tip socket
4A first side surface
4B second side surface
4C rear surface
4D recess
4M socket opening
4R recess
5 power transmission
6 power interrupter
7 front aligner
8 magnet
9 first countershaft
9A spline hole
9B internal space
9C support surface
9D groove
9G internal spline tooth
10 second countershaft
10A groove
10B flange
10C support surface
10G external spline tooth
11 first bevel gear
12 second bevel gear
13 spur gear
14 first intermediate gear
14A shaft
15 second intermediate gear
15A shaft
16 intermittent gear
16M gear opening
17 ball
18 leaf spring
18A opening
19 bearing
20 bearing
21 snap ring
22 snap ring
23 coil spring
24 third countershaft
25 bearing
26 bearing
27 bearing
28 bearing
29 bearing
30 bearing
31 bearing
31M bearing opening
32 bearing
32M bearing opening
33 rotary member
331 outer circumferential surface
332 cutout
332A first side surface
332B second side surface
332C contact surface
332D first tapered surface
332E second tapered surface
34 movable member
35 connector
35A arc
36 screw
100 power tool
101 output shaft
102 tool hole
200 steel post (floor post)
201 post body
202 lower stem screw
203 upper stem screw
204 base
205 support plate
206 lower locknut
207 upper locknut
301 foundation
302 sleeper
AX rotation axis (first rotation axis)
BX rotation axis
CX rotation axis (second rotation axis)

What is claimed is:

1. An attachment, comprising:
an input shaft rotatable about a first rotation axis, the input shaft being configured to receive power input from a power tool;
a tip socket including a recess having a socket opening;
a housing having a housing opening to receive a workpiece, the housing supporting the tip socket in a rotatable manner;
a power transmission configured to transmit, to the tip socket, power input into the input shaft; and
a front aligner configured to stop rotation of the tip socket with the socket opening being aligned with the housing opening, the front aligner including a rotary member including an outer circumferential surface and a cutout, and a movable member insertable into the cutout; wherein
for a period in which the movable member faces the outer circumferential surface, the movable member is prevented from being inserted into the cutout, and
for a period in which the movable member faces the cutout, the movable member is inserted into the cutout and prevents the rotary member from rotating regardless of a rotational direction of the rotary member.

2. The attachment according to claim 1, wherein
the power transmission includes
an intermittent gear on an outer circumferential surface of the tip socket, and a spur gear coupled to the intermittent gear and having the same rotation ratio as the intermittent gear.

3. The attachment according to claim 2, further comprising:

a magnet on an inner surface of the recess.

4. The attachment according to claim 1, wherein the power transmission includes a first intermediate gear and a second intermediate gear each meshing with a spur gear, the spur gear is coupled to an intermittent gear with at least one of the first intermediate gear or the second intermediate gear in between, and the spur gear rotates with at least one of the first intermediate gear or the second intermediate gear meshing with the intermittent gear.

5. The attachment according to claim 1, further comprising:

a magnet on an inner surface of the recess.

6. The attachment according to claim 5, wherein the recess has a plurality of inner surfaces including a first side surface, and a second side surface facing the first side surface with a space in between, the socket opening is located between a first end of the first side surface and a first end of the second side surface, and the magnet has a surface located between a second end of the first side surface and a second end of the second side surface.

7. The attachment according to claim 6, wherein the recess has the plurality of inner surfaces including a rear surface connecting the second end of the first side surface and the second end of the second side surface, and the magnet is on the rear surface.

8. The attachment according to claim 7, wherein the first side surface, the second side surface, and the rear surface are parallel to a second rotation axis, and the first side surface, the second side surface, and the rear surface each have a greater dimension in a direction parallel to the second rotation axis than in a direction perpendicular to the second rotation axis.

9. An attachment, comprising:

an input shaft rotatable about a first rotation axis, the input shaft being configured to receive power input from a power tool;

a tip socket including a recess having a socket opening;

a housing having a housing opening to receive a workpiece, the housing supporting the tip socket in a rotatable manner;

a power transmission configured to transmit, to the tip socket, power input into the input shaft; and a front aligner configured to stop rotation of the tip socket with the socket opening being aligned with the housing opening; wherein the power transmission includes an intermittent gear on an outer circumferential surface of the tip socket, and a spur gear coupled to the intermittent gear, the front aligner includes a rotary member fixed to the spur gear and having a cutout, and a movable member receivable in the cutout, the input shaft is supported by the housing in a manner movable in a front-rear direction parallel to the first rotation axis, the movable member moves in the front-rear direction with the input shaft, and the input shaft moves forward to cause the movable member to be placed into the cutout.

10. The attachment according to claim 9, wherein the power transmission includes a first countershaft connected to the input shaft and rotatable with the input shaft, the attachment further comprises a bearing held on the housing and supporting the first countershaft, and the input shaft is supported by the housing with the first countershaft and the bearing in between.

11. The attachment according to claim 10, further comprising:

a magnet on an inner surface of the recess.

12. The attachment according to claim 9, further comprising:

a magnet on an inner surface of the recess.

13. The attachment according to claim 9, wherein the spur gear has the same rotation ratio as the intermittent gear.

14. An attachment, comprising:

an input shaft rotatable about a first rotation axis, the input shaft being configured to receive power input from a power tool;

a tip socket including a recess having a socket opening;

a housing having a housing opening to receive a workpiece, the housing supporting the tip socket in a rotatable manner;

a power transmission configured to transmit, to the tip socket, power input into the input shaft; and a front aligner configured to stop rotation of the tip socket with the socket opening being aligned with the housing opening; wherein the power transmission includes an intermittent gear on an outer circumferential surface of the tip socket, and a spur gear coupled to the intermittent gear, the front aligner includes a rotary member fixed to the spur gear and having a cutout, and a movable member receivable in the cutout, a power interrupter configured to interrupt the power, wherein the front aligner stops rotation of the tip socket in synchronization with interruption of the power with the socket opening being aligned with the housing opening.

15. The attachment according to claim 14, wherein the power transmission includes an intermittent gear on an outer circumferential surface of the tip socket, and a spur gear coupled to the intermittent gear and having the same rotation ratio as the intermittent gear, and the front aligner includes a rotary member fixed to the spur gear and having a cutout, and a movable member receivable in the cutout in synchronization with interruption of the power.

16. The attachment according to claim 15, wherein the power transmission includes a first countershaft connected to the input shaft and rotatable with the input shaft, and a second countershaft connected to the first countershaft with splines to transmit, to the spur gear, power input into the input shaft, and the power interrupter disengages the splines connecting the first countershaft and the second countershaft.

17. The attachment according to claim 16, further comprising:

a bearing held on the housing and supporting the first countershaft, wherein the input shaft and the first countershaft are movable in a front-rear direction parallel to the first rotation axis, and the input shaft moves forward and the first countershaft moves forward to disengage the splines connecting the first countershaft and the second countershaft.

18. The attachment according to claim 17, wherein the movable member moves in the front-rear direction with the input shaft and the first countershaft, and the input shaft moves forward and the first countershaft moves forward to cause the movable member to be placed into the cutout.

19. The attachment according to claim 15, wherein the power transmission includes a first intermediate gear and a second intermediate gear each meshing with the spur gear, the spur gear is coupled to the intermittent gear with at least one of the first intermediate gear or the second intermediate gear in between, and the spur gear rotates with at least one of the first intermediate gear or the second intermediate gear meshing with the intermittent gear.

20. The attachment according to claim 14, further comprising:

a magnet on an inner surface of the recess.

* * * * *